(12) United States Patent
Sundahl

(10) Patent No.: US 6,734,617 B2
(45) Date of Patent: May 11, 2004

(54) STIFFENING FLAT-PANEL DISPLAYS

(75) Inventor: Robert C. Sundahl, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 132 days.

(21) Appl. No.: 09/819,916

(22) Filed: Mar. 28, 2001

(65) Prior Publication Data

US 2002/0140342 A1 Oct. 3, 2002

(51) Int. Cl.[7] .................................................. H01J 1/62
(52) U.S. Cl. ........................ 313/493; 313/422; 313/495
(58) Field of Search ................................ 313/493, 500, 313/2.1, 422, 495, 491; 349/73, 74, 77, 81; 345/1, 1.3, 3.2, 3.1, 33, 55; 359/82, 83, 88; 445/24; 220/2.1 R, 2.2, 2.3 R, 2.3 A, 2.1 A

(56) References Cited

U.S. PATENT DOCUMENTS

| | | | | |
|---|---|---|---|---|
| 4,408,836 A | * | 10/1983 | Kikuno | 350/334 |
| 5,914,698 A | * | 6/1999 | Nicholson et al. | 345/1 |
| 6,097,455 A | * | 8/2000 | Babuka et al. | 349/73 |
| 6,343,862 B1 | * | 2/2002 | Sawai et al. | 353/1 |
| 6,498,592 B1 | * | 12/2002 | Matthies | 345/1.1 |

\* cited by examiner

*Primary Examiner*—Vip Patel
(74) *Attorney, Agent, or Firm*—Trop, Pruner & Hu, P.C.

(57) ABSTRACT

Tiled flat-panel displays have increased mechanical stability due to the addition of stiffening straps affixed across seams between individual display modules. The stiffening straps may increase mechanical strength of the display by redistributing stress placed on the display from the front of the display to the straps.

11 Claims, 3 Drawing Sheets

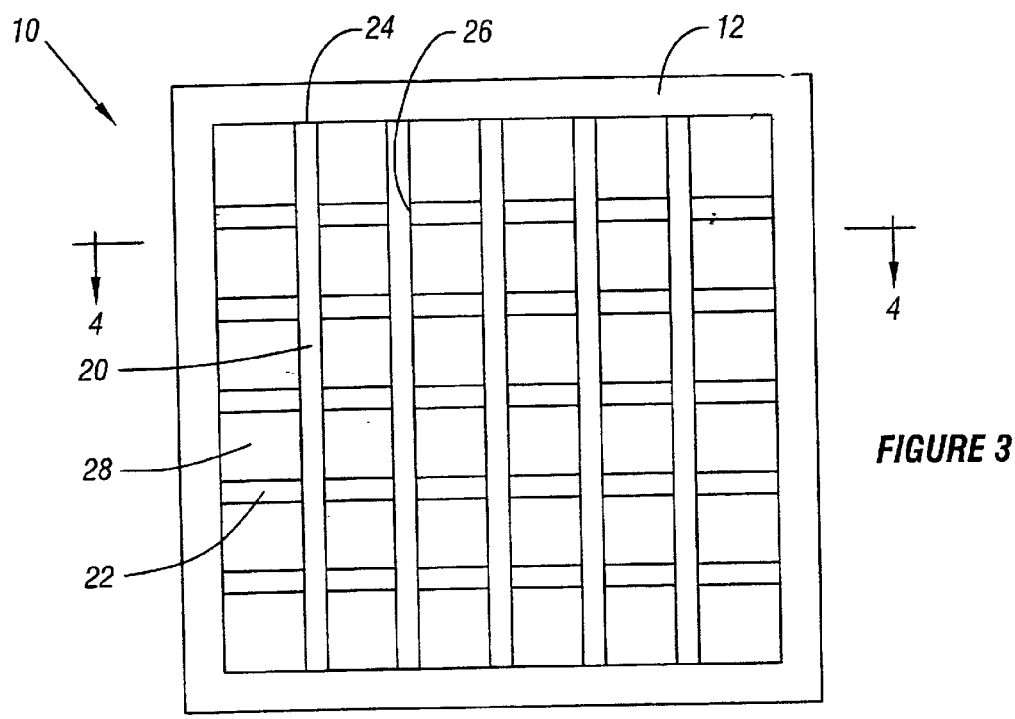
FIGURE 3
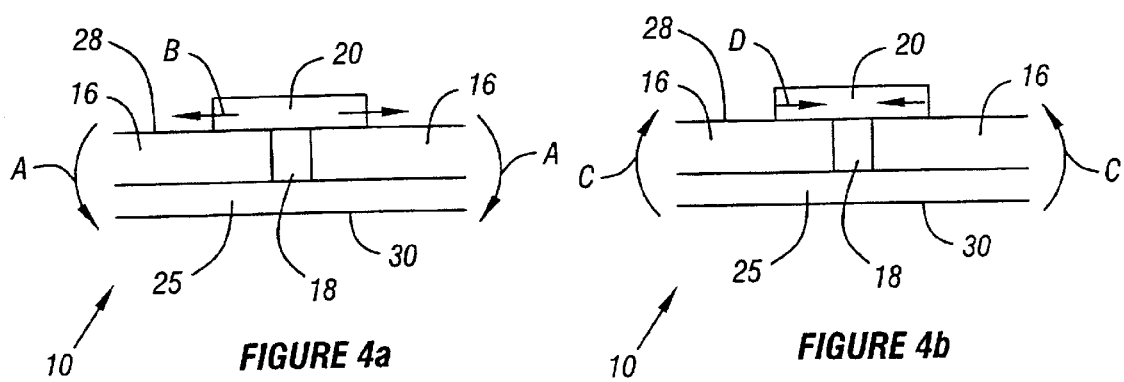
FIGURE 4a  FIGURE 4b

STIFFENING FLAT-PANEL DISPLAYS

BACKGROUND

This invention relates generally to tiled, flat-panel displays.

Flat-panel displays are widespread in their use. For example, watches, clocks, telephones, and laptop computers may all incorporate flat-panel displays. Because of the relatively small size of the flat panel displays used in the above examples, they are usually monolithic.

A monolithic display may be limited in size due to a variety of factors. For example, increasing the size of an active matrix liquid crystal display by one square inch may require millions of dollars to be invested in capital equipment and may lead to an increase in component failure or malfunction. Moreover, in general, increasing the size of monolithic flat-panel displays may also increase the number of defects per unit of area so that the yield of functional displays is low. That means increased cost to the consumer to compensate for the loss of functional displays during the manufacturing process. Thus, very large flat-panel displays may not be cost effective.

One way to circumvent the size limitations placed on monolithic flat-panel displays is to use an array of smaller display modules. The smaller display modules may be "tiled" to create a large display that appears monolithic to the viewer.

A variety of devices may utilize a large, tiled, flat-panel display. For example, large screen televisions, public information displays, displays in public trading rooms, displays at sporting arenas, and electronic signs may all incorporate a large array, tiled, flat-panel display.

Sandwiching an array of display modules between two glass plates may lend mechanical stability to tiled, flat-panel displays. Increasing the thickness of the glass plates may further increase the mechanical stability of the tiled displays.

Placing tiled, flat-paneled displays in a "picture" or "window" frame may also lend mechanical stability to the displays. The frame may reduce a large display's tendency to twist and bend at the periphery. However, the frame may not prohibit bending and twisting at the front or back of the display, away from the periphery. For example, in an outdoor sporting arena, wind may cause a large display to bend or bow in or out at the center of the display.

Mechanical stability that is obtained by using thick glass plates and robust frames may increase the weight and cost of large displays without significantly reducing their tendency to bend or to bow. Thus, the increase in the weight and cost of the large displays may outweigh the benefits of known mechanical strengthening techniques.

Therefore, there is a need to improve the mechanical stability for tiled, flat-panel displays without significantly increasing the weight and cost of the displays.

BRIEF DESCRIPTION OF THE DRAWINGS

FIG. 3 is a back plan view of the display of FIG. 2 after fabrication according to one embodiment of the present invention;

FIG. 4a is an enlarged partial cross-sectional view, taken generally along the line 4—4, of a portion of the embodiment of the present invention shown in FIG. 3 under one type of stress;

FIG. 4b is an enlarged partial cross-sectional view, taken generally along the line 4—4, of a portion of the embodiment of the present invention shown in FIG. 3 under a different type of stress.

DETAILED DESCRIPTION

Figure 1:
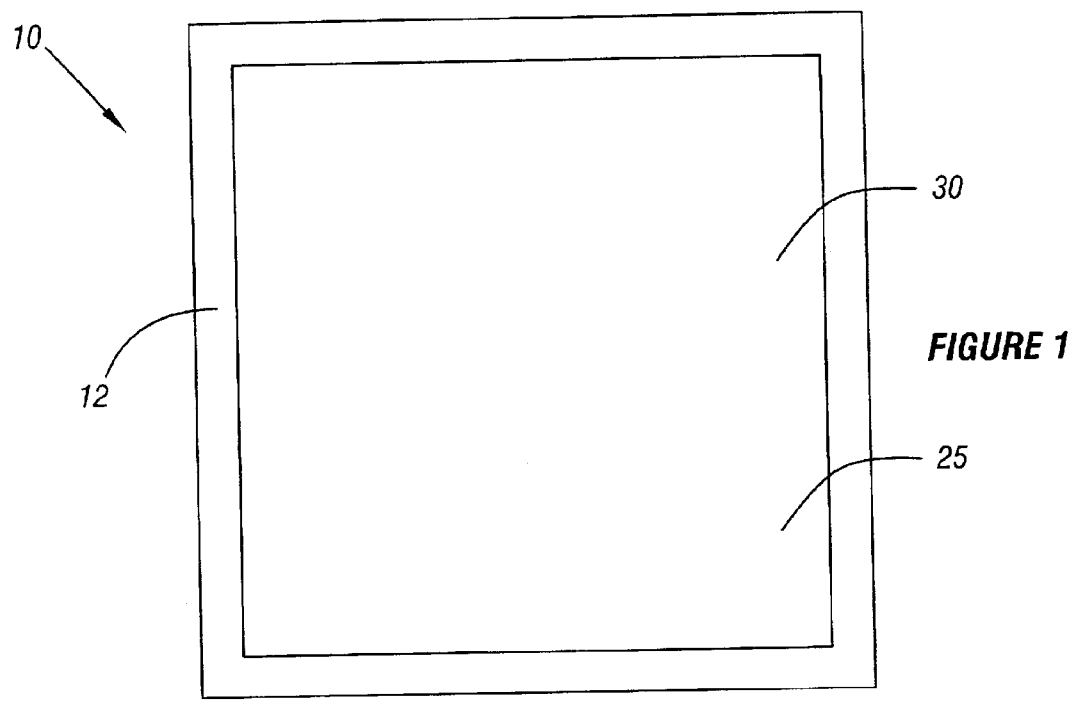
FIG. 1 is a front plan view of a tiled, flat-panel display according to one embodiment of the present invention.

Referring to FIG. 1, in accordance with one embodiment of the present invention, a tiled, flat-panel display 10 may include an optical integrator 25 having a front surface 30. In addition, a frame 12 may surround the display 10.

A viewer observes an image on the display 10 through the front surface 30 of the optical integrator 25. That is, the front surface 30 of the display 10 may have light emitted through it. The optical integrator 25 may be made of a substantially transparent material such as glass. The frame 12 may be made of a supportive material, such as a plastic or a metal, which may reduce the tendency of the display 10 to twist or bend at the periphery.

Figure 2:
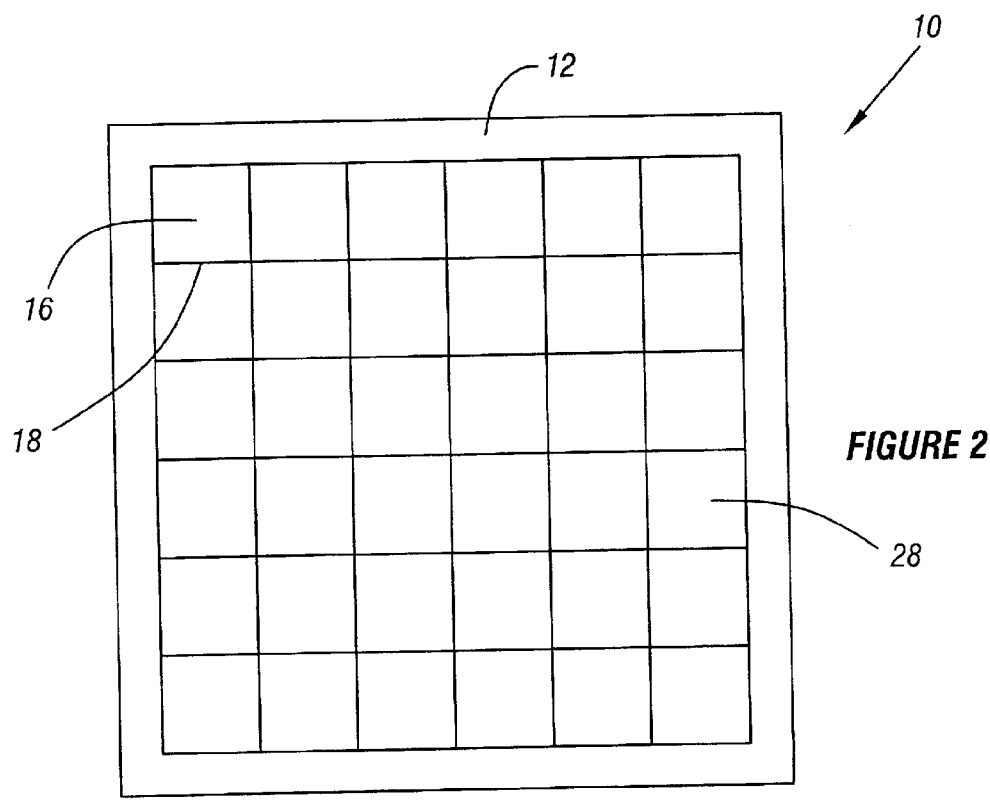
FIG. 2 is a back plan view of the display in FIG. 1 during fabrication in accordance with one embodiment of the present invention.

Tiling of individual display elements 16 may occur during fabrication, as shown in FIG. 2. The plurality of display elements 16, on the back surface 28 of the display 20, may ultimately create the image observed by the viewer through the front surface 30 of the display 10. The display elements 16 emit visible light through the front surface 30 (FIG. 1). The individual display elements 16 that make up the tiled, flat-panel display 10 may be liquid crystal, field emission, plasma, or electroluminescent displays, as examples.

Individual display elements 16 may be square, rectangular, or another geometric shape. However, in one embodiment of the invention, the display elements 16 may be of the same size and geometric shape.

Weak points or seams 18 known as stress risers may develop when the display elements 16 combine to form the composite display 10. Without additional support, a bending stress placed on the display 10 may be concentrated on the optical integrator 25 at the seams 18. This concentration of stress may result in catastrophic failures. For example, a bending stress may provide the potential for the initiation and propagation of cracks in the display 10. Thus, the optical integrator 25 may have a tendency to break at the seams 18 when subjected to a bending force.

In one embodiment of the invention, each display element 16 may be adjacent to at least two other display elements 16 to form seams 18 in both the vertical and horizontal directions. Thus, an increased number of display elements 16 provide an increased number of seams 18 and a decrease in the mechanical stability of the display 10. Consequently, the larger the display 10, the greater the potential for the optical integrator 25 to break at the seams 18 especially when subjected to a non-peripheral stress.

A plurality of vertical straps 20 and horizontal straps 22 may attach to the back surface 28 of the display 10 as shown in FIG. 3. In one embodiment of the invention, the straps 20 and 22 may bridge the seams 18 that create mechanical weakness in the display 10. That is, each one of the straps 20 and 22 may be attached to a portion of each of two adjacent display elements 16 so that the straps 20 and 22 lie across the seams 18. In one embodiment, straps 20 and 22 may be adhesively secured to the elements 16. Moreover, the straps 20 and 22 may be positioned over the seams 18 so that they are perpendicular to each other.

To further mechanical stability and overall strength of the display 10, the straps 20 and 22 may connect to the frame 12 by a plurality of joints 24. In addition, the vertical straps 20 and the horizontal straps 22 may also connect to each other by a plurality of joints 26. In one embodiment of the invention, the straps 20 and 22 may be attached to each other by an adhesive, for example. Additionally, the straps 20 and 22 may also be adhesively attached to the frame 12. However, the straps 20 and 22 may be unconnected to one another or all of the straps 20 and 22 may be formed as one integral piece.

The above-described arrangement of the straps 20 and 22 may contribute to the stability of the display 10 by providing a mechanical interconnection between adjacent display elements 16. Moreover, the positioning of the straps 20 and 22 may redistribute stress from the optical integrator 25 to the straps 20 and 22. Thus, the attachments and positioning of the straps 20 and 22 may diminish the stress placed on the optical integrator 25 and hence the tendency of the display 10 to break.

In one embodiment of the invention, two adjacent display elements 16 are positioned between the optical integrator 25 and one of the straps 20, as shown in FIGS. 4a and 4b. The vertical strap 20 lies across the seam 18 between the two display elements 16 where it is adhered to a portion of each of the back surfaces 28 of the adjacent display elements 16, according to one embodiment. Although not shown for purposes of clarity, the horizontal straps 22 may be similarly positioned across the seams 18 between adjacent display elements 16.

Stress concentrations placed on the display 10 around the seams 18 may be redistributed as tension in the straps 20 or 22, as shown in FIG. 4a. The display 10 may be subjected to a bending stress "A" that bends the display 10 forward relative to the frame 12, toward the front surface 30 of the optical integrator 25. Without the straps 20 and 22, bending stress A may cause the optical integrator 25 to crack at the seams 18. However, the straps 20 and 22 may limit the degree to which the display 10 may bend in response to the stress A. That is, the bending stress A placed on the display 10 may be redistributed as a tensional stress "B" placed on the strap 20 or 22. Thus, the strap 20 or 22 may significantly reduce the concentration of the bending stress A placed on the optical integrator 25 at the seam 18.

Stress concentrations placed on the display 10 around the seams 18 may also be redistributed as compression, as shown in FIG. 4b. The display 10 may be subjected to bending stress "C" that bends the display 10 backward, toward the back surface 28 of the display 10. Thus, bending stress C is opposite in direction to that of bending stress A (FIG. 4a). Again, the degree to which the optical integrator 25 and the display elements 16 may be subjected to bending stress C may be limited by the presence of the strap 20 or 22. In this case, the bending stress C placed on the display 10 around the seam 18 may be redistributed as compression "D" placed on the strap 20 or 22. Thus, the redistribution of bending stress C to compression D may significantly reduce the concentration of stress placed on the display 10.

In sum, the redistribution of bending stress to either tension or compression may decrease the tendency of the display 10 to fail at the seams 18.

Figure 5:
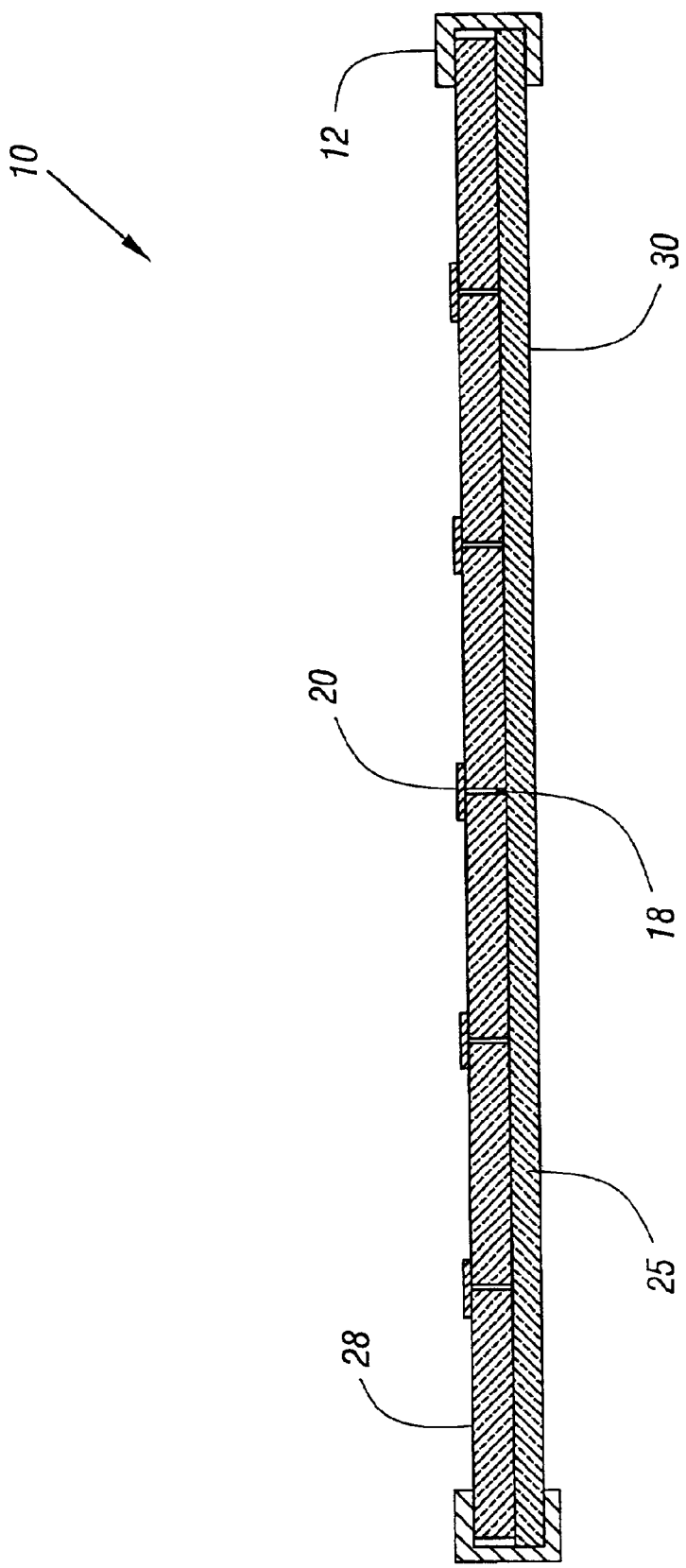
FIG. 5 is an enlarged cross-sectional view taken generally along the line 4—4 in FIG. 3.

In one embodiment of the present invention, straps 20 may attach across every vertical seam 18 between display elements 16 in the display 10, as shown in FIG. 5. The straps 22 may be similarly situated over every horizontal seam 18, in one embodiment. Thus, a non-peripheral bending force, in either direction, may be transferred from the optical integrator 25 over the entire back surface 28 of the display, via the straps 20 and 22. Moreover, the combination of the vertical straps 20 and horizontal straps 22 at the juncture of vertical and horizontal seams 18 may significantly redistribute bending stress at these points to improve the integrity of the display 10. Lastly, the frame 12 may reduce the tendency of the display 10 to twist or bend at the periphery. Taken together, the vertical straps 20, the horizontal straps 22 and the frame 12 may provide sufficient mechanical strength to significantly consume many types of bending and twisting stresses that may lead to cracking or other failures of the display 10. In turn, this may allow for the construction of a large array, tiled, flat-panel display that is lightweight yet sturdy.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A flat panel display comprising:
   a tiled array of display elements wherein each display element has a front surface that emits light and a back surface that does not substantially emit light;
   a plurality of seams between adjacent display elements, said seams having lengths;
   a plurality of straps attached to said back surface along the seam length between the display elements; and
   an optical integrator attached to the front surface of the display elements, said plurality of straps redistributing stress from the optical integrator to the straps.

2. The display of claim 1 wherein the plurality of straps are attached to the back surfaces so that the straps are perpendicular to each other.

3. The display of claim 2 wherein the perpendicular straps are attached to each other.

4. The display of claim 1 including a frame.

5. The display of claim 4 wherein the perpendicular straps are attached to the frame.

6. The display of claim 1 wherein the plurality of straps redistribute bending stress as tension in the straps.

7. The display of claim 1 wherein the plurality of straps redistribute stress as compression in the straps.

8. A method comprising:
   configuring a flat-panel display from an array of display elements, each of the display elements having a front surface that emits light and a back surface that does not substantially emit lights;
   fastening straps to the back surfaces of adjacent display elements across seams between the adjacent display elements; and
   redistributing a stress placed on a front surface of the flat-panel display to said straps.

9. The method of claim 8 wherein redistributing a stress includes redistributing a bending stress on said front surface as compression in the straps.

10. The method of claim 8 wherein redistributing a stress includes redistributing a bending stress as tension in the straps.

11. The method of claim 8 including adhesively securing said straps to said display in a grid pattern.

* * * * *